(12) United States Patent
Hunt et al.

(10) Patent No.: US 11,593,731 B2
(45) Date of Patent: Feb. 28, 2023

(54) ANALYZING AND MANAGING PRODUCTION AND SUPPLY CHAIN

(71) Applicant: The Boeing Company, Chicago, IL (US)

(72) Inventors: Jeffrey H. Hunt, Los Angeles, CA (US); Lori S. Smith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/886,085

(22) Filed: May 28, 2020

(65) Prior Publication Data
US 2021/0374637 A1   Dec. 2, 2021

(51) Int. Cl.
G06Q 10/00 (2012.01)
G06Q 10/0631 (2023.01)
G06Q 10/0633 (2023.01)

(52) U.S. Cl.
CPC ... *G06Q 10/06313* (2013.01); *G06Q 10/0633* (2013.01)

(58) Field of Classification Search
CPC .................................................. G06Q 10/063
See application file for complete search history.

(56) References Cited

U.S. PATENT DOCUMENTS

| | | | |
|---|---|---|---|
| 6,944,521 B2* | 9/2005 | Yoshida ............. | H05K 13/0882 700/169 |
| 2002/0055925 A1* | 5/2002 | Kondo ..................... | G06F 16/00 |
| 2018/0285810 A1* | 10/2018 | Ramachandran ....... | G06F 16/27 |
| 2019/0066043 A1* | 2/2019 | McGinty ................. | G06F 16/29 |
| 2020/0047391 A1* | 2/2020 | Lettowsky ......... | G05B 23/0235 |
| 2021/0158370 A1* | 5/2021 | Koudall ................. | B33Y 50/02 |

OTHER PUBLICATIONS

Schorr, Case Study: A Systems Approach to Supply Chain Cyber-risk Management; 2017, University of Denmark, pp. 30-35 (Year: 2017).*
Franziska Schorr (Case Study: A Systems Approach to Supply Chain Cyber-risk, Master Thesis, Management Kongens Lyngby, Jun. 2017) (Year: 2017).*
Levenson, "STPA Handbook", Mar. 2018, Partnership for Systems Approaches to Safety and Security.
MIT Sloan School of Management, "BlockChian Technologies: Business Innovation and Application", Online Course, 2019, GetSmarter, https://executive-education.mit.edu/mit-blockchain-technologies-online-short-course-sf/?&ef_id=c:317317490150_d:c_n:g_ti:kwd-296270281859_p:_k:blockchain_m:e_a:63317367316&gclid=EAIaIQobChMI5sT2zeOo4wIVkY7ICh16qwrIEAAYASAAEgJi5PD_STPA.
Partnership for Systems Approach to Safety and Security (PSASS), "2019 STAMP Workshop", 2019, http://psas.scripts.mit.edu/home/2019-stamp-workshop/.

* cited by examiner

*Primary Examiner* — Hafiz A Kassim
*Assistant Examiner* — Zahra Elkassabgi
(74) *Attorney, Agent, or Firm* — Yee & Associates, P.C.

(57) ABSTRACT

A method and apparatus for controlling a supply chain including a production system. Sensor data is received from a sensor in the production system or elsewhere in the supply chain. The sensor data identifies an event in the production system or elsewhere in the supply chain. Event information for the event is stored in an events blockchain. The event information from the events blockchain is used in a process model simulation of the production system or the supply chain to identify an undesirable condition in the production system or elsewhere in the supply chain. System theoretic process analysis is used to identify a change in the production system or elsewhere in the supply chain to prevent occurrence of the undesirable condition.

18 Claims, 5 Drawing Sheets

ANALYZING AND MANAGING PRODUCTION AND SUPPLY CHAIN

BACKGROUND INFORMATION

1. Field

The present disclosure relates generally to systems and methods for controlling a supply chain including a production system for producing products such as aircraft.

2. Background

Producing a product, such as an aircraft, is highly complex, with thousands of interactions between humans, software, hardware and the environment occurring daily. The production process involves many interrelated processes and component parts and requires many steps for combining the parts to form the product as designed. It is desirable to know and understand what is happening at various points throughout the production system and supply chain in real-time to enable accurate evaluation of the process. In particular, a need exists to be able to identify the occurrence of undesirable conditions in the production process or supply chain, so that appropriate action may be taken to implement new system controls in the process to maintain efficiency, quality and safety.

Therefore, there is a need for a method and apparatus that take into account at least some of the issues discussed above, as well as other possible issues.

SUMMARY

Illustrative embodiments provide a method of using a data processing system for controlling a supply chain. Sensor data is received by the data processing system from a sensor in the supply chain. The sensor data identifies an event in the supply chain. Event information for the event is recorded in an events blockchain by the data processing system.

Illustrative embodiments also provide an apparatus for controlling a supply chain comprising a blockchain system and a process model simulator. The blockchain system is configured to receive sensor data from a sensor in the supply chain, wherein the sensor data identifies an event in the supply chain, and to record event information for the event in an events blockchain. The process model simulator is configured to use the event information from the events blockchain in a process model simulation of the supply chain to identify an undesirable condition in the supply chain.

Illustrative embodiments also provide a computer program product for controlling a supply chain. The computer program product comprises a computer readable storage medium having program instructions embodied therewith, the program instructions are executable by a data processing system to cause the data processing system to: receive sensor data from a sensor in the supply chain, wherein the sensor data identifies an event in the supply chain, and record event information for the event in an events blockchain.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that currently data analytics are used to determine what is happening and where in a production process. It is desirable to obtain results more quickly than may be possible using data analytics, however, eliminating the significant time that may be needed to post process the data. Blockchain offers a more efficient way to access key pieces of production and supply chain data. Furthermore, the results from data analytics, when finally available, may be limited to what is happening and where undesirable conditions are occurring on the factory floor. Data analytics cannot explain why undesirable conditions are occurring in a particular production process or point in the supply chain. It is desirable to identify why undesirable conditions are occurring in a production process in a manner such that appropriate new controls and improvements of the process can be identified and implemented.

A blockchain is a continuously growing list of records, called blocks, which are linked and secured using cryptography. Each block in a blockchain typically contains a cryptographic hash of the previous block, a timestamp, and transaction data. A blockchain becomes an immutable record, impervious to modification of the data stored in the blockchain. A blockchain may be used as a decentralized, distributed, and public or private permissions based digital ledger for recording transactions across many computers. A blockchain is typically managed by a peer-to-peer network collectively adhering to a protocol for validating new blocks. Once recorded, the data in any given block cannot be altered retroactively without the alteration of all subsequent blocks, which requires collusion of the blockchain network.

Illustrative embodiments identify and implement specific controls for controlling various portions of a supply chain, including a production system, by using, for example, system theoretic process analysis (STPA) combined with blockchain. Illustrative embodiments may be used in supply chains including production systems for producing products such as aircraft, missiles, satellites, and the like, more efficiently. In accordance with an illustrative embodiment, production and supply chain systems are modeled using STPA in combination with the capability of blockchain to retrieve stored information regarding the flow and operational aspects of production and supply chain systems. These data are used to identify changes in system controls to prevent undesirable conditions from developing as a result of the design of the system and mitigate losses in existing production and supply chain systems.

An immutable record of all events in a supply chain including a production system is invaluable in determining where a lack of system controls exist. Therefore, in accordance with an illustrative embodiment, blockchain provides the bases for further analysis with STPA. The combination of STPA and blockchain yields a good understanding and deep insights of the production process in operation as well as the supply chain that enable continuous improvement in the production system and interfaces of the production system with the supply chain.

Current systems, such as those that use data analytics, are not as adapted to non-linear production models as desired. The combination of STPA with blockchain in accordance with an illustrative embodiment takes these and other considerations into account and provides the capability to analyze systems using a non-linear approach, which gives deeper and more reliable insights than current methods. Using blockchain in combination with STPA provides the capability to determine the system generated causes for why undesirable conditions are occurring, not just where and when they occur. This provides opportunities to develop effective new controls that will continuously improve the assembly process.

Illustrative embodiments use blockchain and system theoretic process analysis, STPA, to greatly improve the understanding of the operation of production systems and the supply chain beyond what is provided by current analysis methods. System theoretic process analysis, as used herein, is a process by which system-level causal factors are examined by analyzing component interactions within the system. By innovatively combining sensors, blockchain, simulations, and system theoretic process analysis (STPA), illustrative embodiments reveal production system and supply chain problems in near real-time and quickly determine the causes of problems in the system. This capability is not possible with current linear analysis methodologies.

In accordance with an illustrative embodiment, relevant data for a supply chain including a production system in action is captured and immutably recorded in a blockchain. The data then may be immediately extracted from the blockchain in near real-time and used in process model simulation of the system to identify undesirable conditions. System theoretic process analysis (STPA) then may be used to determine system causes of the undesirable conditions in a relatively short time, as compared to current systems and methods. STPA may be an implementation of STPA as is known in the art. For example, the use of STPA may include modeling the control structure of the system, identifying unsafe control actions that will lead to the undesirable conditions, and identifying causal scenarios that describe how the system can get into a condition that will lead to a loss. Once the system causes are determined, new controls may be implemented in the production system and supply chain to eliminate the source of the undesirable condition.

Illustrative embodiments thus provide for continual improvement of production systems including supply chains that are enabled by the understanding and insights provided by the integration of blockchain and system theoretic process analysis (STPA).

Figure 1:
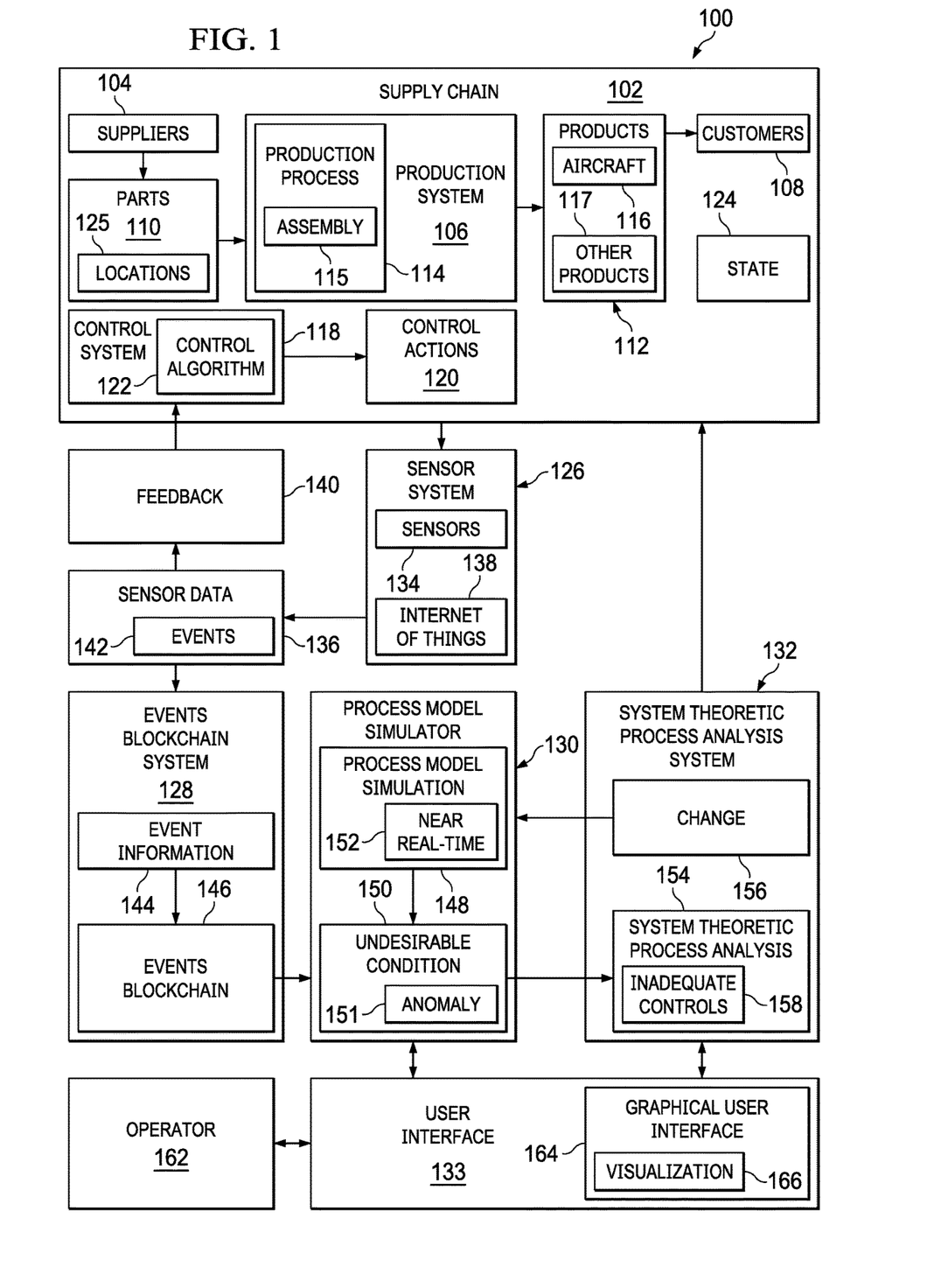
FIG. 1 is an illustration of a block diagram of a system for controlling a production system including the supply chain based on integrating blockchain, process simulations, and system theoretic process analysis (STPA) in accordance with an illustrative embodiment.

Turning to FIG. 1, an illustration of a block diagram of a system for controlling a production system to include the supply chain based on integrating blockchain, process simulations, and system theoretic process analysis (STPA) is depicted in accordance with an illustrative embodiment. System 100 is configured to control any appropriate portion of the production system and supply chain 102.

Supply chain 102 may comprise any appropriate systems, activities, information, and resources involved in supplying a product or service to a consumer. In this example, without limitation, supply chain 102 includes suppliers 104, production system 106, and customers 108. Suppliers 104 provide parts 110 for use by production system 106. Production system 106 uses parts 110 to produce products 112 for customers 108. Supply chain 102 is thus a top-level system, so that production system 106, for example, is an element of the broader supply chain 102. Illustrative embodiments of the present application may be used to control supply chain 102, with production system 106 and the underlying assembly parts 110 as subsets of supply chain 102.

In the present application, including in the claims, unless explicitly stated otherwise, the term "supply chain", and other similar terms, refers to both the entire supply chain and to any portion of the supply chain that is less than the entire supply chain. Therefore, actions performed on or in a portion of a supply chain are actions performed on or in the supply chain and items in or characteristics of a portion of a supply chain are items in or characteristics of the supply chain. For example, actions performed on or in production system 106 are actions performed on or in supply chain 102 and items in or characteristics of production system 106 are items in or characteristics of supply chain 102.

In the present application, including in the claims, unless explicitly stated otherwise, "part", and other similar terms, refers to both an entire product and to any portion of the product that is less than the entire product. For example, parts 110 may be combined in production system 106 to form other parts 110, which may be further combined to form products 112, which also comprises "parts".

Production system 106 may comprise any appropriate facility, machines, tools, and processes for performing production process 114. For example, without limitation, production system 106 may include a factory or other appropriate manufacturing or other facility in which production process 114 is performed. Production process 114 comprises any appropriate process for producing products 112. For example, without limitation, production process 114 may include assembly 115 of parts 110 to produce products 112.

Products 112 may include any appropriate products. For example, without limitation, products 112 may include aircraft 116. Aircraft 116 may be any appropriate type of aircraft that may be configured to perform any appropriate operation or mission. For example, without limitation, aircraft 116 may be a commercial passenger aircraft, a cargo aircraft, a military aircraft, a personal aviation aircraft, or any other appropriate type of aircraft. Aircraft 116 may be a fixed wing aircraft, a rotary wing aircraft, or a lighter-than-air aircraft. Aircraft 116 may be a manned aircraft or an unmanned aircraft.

In other embodiments, products 112 may be other products 117 that require assembly of components. For example, other products 117 may include vehicles other than aircraft 116 and any other appropriate products. Other embodiments may be used in relation to supply chains and production systems for providing services or services in combination with products 112.

Operation of supply chain 102 may be controlled by control system 118. Control system 118 may include any appropriate number of systems that may be configured to generate control actions 120 for controlling the operation of supply chain 102 including production system 106. Control actions 120 generated by control system 118 may be defined by control algorithm 122.

State 124 of supply chain 102 at any point in time may be defined by the condition of components of supply chain 102 and parts 110 and products 112 in supply chain 102 at that time. For example, without limitation, state 124 of production system 106 to include supply chain 102 at any particular point in time may be defined, at least in part, by locations 125 of parts 110 in production system 106, or elsewhere in supply chain 102, at that time.

In accordance with an illustrative embodiment, system 100 for controlling supply chain 102 includes sensor system 126, events blockchain system 128, process model simulator 130, system theoretic process analysis system 132, and user interface 133.

Sensor system 126 may comprise a plurality of sensors 134 for collecting sensor data 136 regarding the operation of supply chain 102 including production system 106. Sensors 134 may include any appropriate number and type of sensors. For example, without limitation, sensors 134 may include image sensors, lidar, other sensors, or various combinations of sensors. As a further example, sensors 134 may include radio-frequency identification, RFID, tags attached to components of supply chain 102 including production system 106, parts 110 in supply chain 102, or both. For example, sensors 134 may be included in a portion of a factory or other production system 106, such as incorporated in the walls, floors, or other structures in the factory and the like.

Sensors 134 in sensor system 126 may be configured to transfer sensor data 136 for processing in any appropriate manner via any appropriate communication links. Sensor data 136 may be transferred from sensors 134 for use via wired communication links, fiber optic communication links, wireless communication links, or any other appropriate communication links or combination of different types of communication links.

For example, without limitation, sensor system 126 may comprise Internet of things 138 in which each sensor in plurality of sensors 134 comprises a computing device with a unique identifier and the ability to transfer sensor data 136 over a network. The capabilities of Internet of things 138 may be used to facilitate or improve the transfer of sensor data 136 from sensors 134 for use.

Control system 118 may include closed-loop feedback control. In this example, control actions 120 from control system 118 are dependent on feedback 140 from supply chain 102 of the value of a variable being controlled. Sensor data 136 may be provided as feedback 140 to control system 118. Control system 118 may be configured to use feedback 140 to generate control actions 120 in accordance with control algorithm 122 to drive a variable being controlled from the value indicated by feedback 140 to a desired value.

Sensor data 136 indicates the occurrence of events 142 in production system 106 to include supply chain 102. Any appropriate events 142 may be indicated by sensor data 136. For example, without limitation, events 142 may include locations 125 of parts 110 in production system 106 or elsewhere in supply chain 102 at specific times as indicated by sensor data 136.

Sensor data 136 is provided to events blockchain system 128. Events blockchain system 128 is configured to store event information 144 for events 142 in events blockchain 146.

Event information 144 stored in events blockchain 146 is retrieved and provided to process model simulator 130. Process model simulator 130 is configured to use event information 144 in process model simulation 148 of production system 106 to include supply chain 102 to identify undesirable condition 150 in operation of production system 106 to include supply chain 102. The retrieval of event information 144 from events blockchain 146 and running of process model simulation 148 to identify undesirable condition 150 may be performed in near real-time 152.

Undesirable condition 150 may include any state 124 of production system 106 to include supply chain 102 in which supply chain 102 including production system 106 is not operating in a desired manner. For example, without limitation, undesirable condition 150 may be related to safety, efficiency, quality, or any other appropriate issues or combinations of issues related to the operation of supply chain 102 including production system 106.

Undesirable condition 150 may include anomaly 151 in the operation of production system 106 to include supply chain 102 in which state 124 of supply chain 102 at a particular point in time, as indicated by event information 144, is different from the expected or desired state of supply chain 102 at that time as determined by process model simulation 148 of supply chain 102. For example, without limitation, anomaly 151 may be identified where the actual locations 125 of parts 110 in production system 106 or elsewhere in supply chain 102 at a particular point in time, as indicated by event information 144, are different from the expected locations of the same parts at the same point in time as determined by process model simulation 148.

Process model simulator 130 may leverage existing systems for process model simulation 148 and visualization of the results. For example, existing manufacturing system data, such as operation times, radio-frequency identification (RFID) data, master schedule information, and the like, may be provided as input for process model simulation 148.

Production system 106 may be modeled using simulation-based predictive and prescriptive analytic software, such as ProModel™, available from ProModel Corporation of Allentown, Pa. Such a product may be used to track where a part is versus where it should be in production system 106 to identify delays in the production process. It also may be used to identify whether a variance is normal or an indication of a problem in the production process. Existing capabilities may be used for visualization of the results of process model simulation 148, such as facility models of production system 106 and available visualizations of major tooling, department locations, and part histories in production system 106.

System theoretic process analysis system 132 is configured to use the analysis process to identify change 156 to production system 106 to include supply chain 102 to prevent the occurrence or reoccurrence of undesirable condition 150. Change 156 includes any appropriate number of changes to any appropriate portion of production system 106 or supply chain 102. For example, without limitation, system theoretic process analysis system 132 may identify inadequate controls 158 in production system 106 or anywhere in supply chain 102. In this case, change 156 may include changes to the controls of the system to prevent the occurrence or reoccurrence of undesirable condition 150.

Change 156 may include appropriate changes to control algorithm 122 to change control actions 120 that are generated to control the operation of production system 106 to include supply chain 102. For example, control system 118 may select control actions 120 based on current state 124 to keep current and future operations within expected thresholds. New control actions 120 may be determined to reduce the risk of system losses based on near real-time simulated validation of the results of system theoretic process analysis 154.

Change 156, such new control actions 120, may be implemented in production system 106 or elsewhere in supply chain 102 as appropriate. For example, change 156 may provide optimized functional, logical and physical models for new factory builds. Change 156 may implement corrections for an operational factory or other production system 106 to keep production processes within desired thresholds. New control actions 120 may be implemented for both new and current factories or other production systems 106 to keep production processes from migrating toward a higher state of risk. Process model simulation 148 of supply chain 102 also is changed to reflect change 156 implemented in supply chain 102 including production system 106.

User interface 133 provides an appropriate interface to process model simulator 130 and system theoretic process analysis system 132 for operator 162. For example, without limitation, operator 162 may be an engineer or another appropriate operator of the system. For example, user interface 133 may include graphical user interface 164 implemented on any appropriate user interface device. Graphical user interface 164 may be configured to provide visualization 166 of the results of process model simulation 148 of supply chain 102 to operator 162. For example, without limitation, visualization 166 may include a graphical representation of undesirable condition 150 in operation of production system 106 or elsewhere in supply chain 102, as identified by process model simulation 148.

The illustration of system 100 and supply chain 102 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
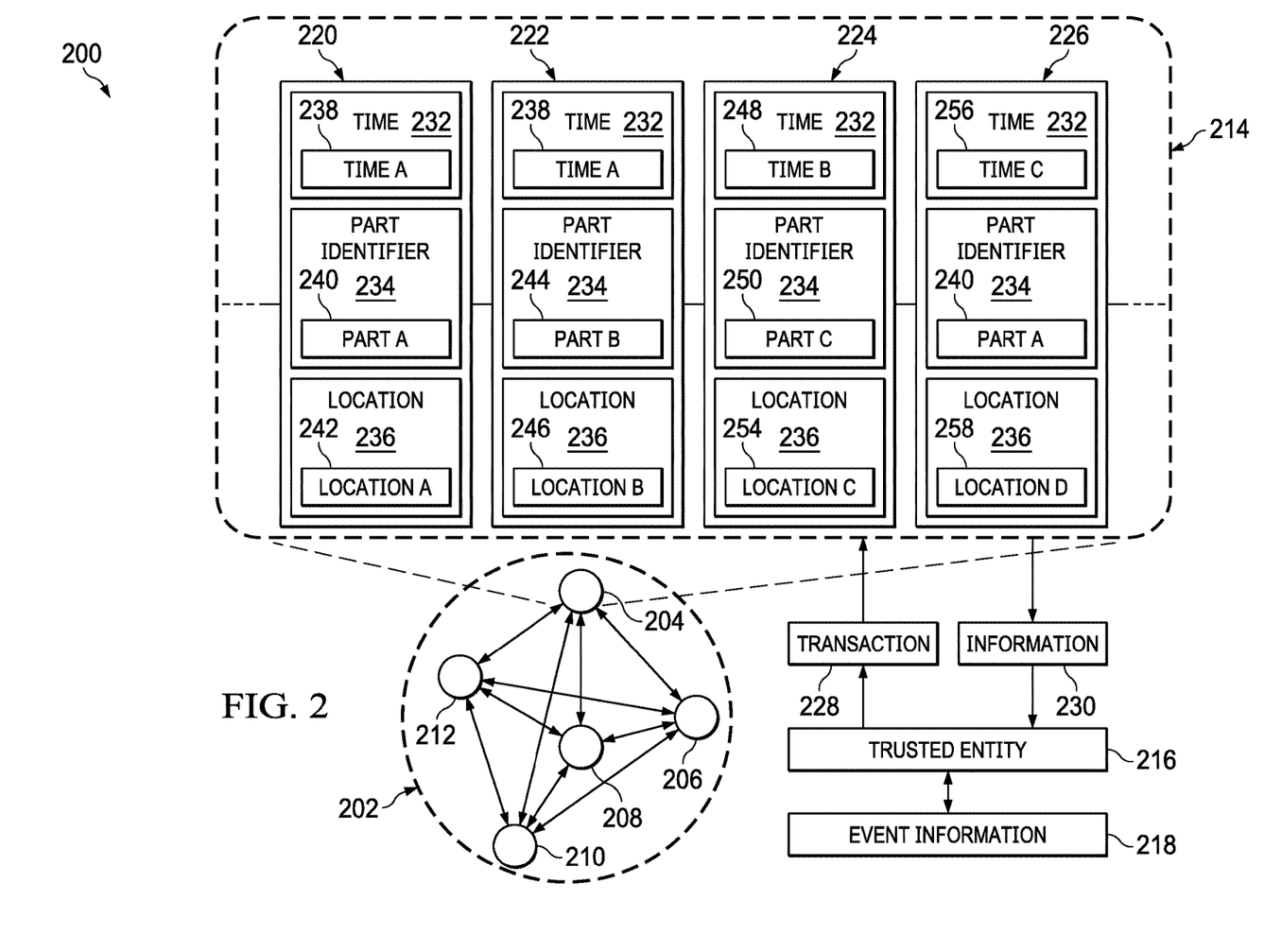
FIG. 2 is an illustration of an events blockchain system in accordance with an illustrative embodiment.

Turning to FIG. 2, an illustration of an events blockchain system is depicted in accordance with an illustrative embodiment. Events blockchain system 200 is an example of one implementation of events blockchain system 128 in FIG. 1.

Events blockchain system 200 comprises events blockchain network 202. Events blockchain network 202 is a blockchain network that is set up to store and maintain event information for events occurring in a supply chain. For example, without limitation, events blockchain network 202 may be a blockchain network that is configured to store and maintain event information 144 for supply chain 102 including production system 106 in FIG. 1.

Events blockchain network 202 comprises plurality of nodes 204, 206, 208, 210, and 212. Each of the plurality of nodes 204, 206, 208, 210, and 212 of events blockchain network 202 may be controlled by an entity that has agreed to participate in the operation and use of events blockchain network 202 for the purpose of accurately tracking event information for a supply chain over time. Events blockchain network 202 in accordance with an illustrative embodiment may have more or fewer nodes than illustrated in FIG. 2. Events blockchain network 202 in accordance with an illustrative embodiment may comprise any appropriate number of nodes.

Each node 204, 206, 208, 210, and 212 in events blockchain network 202 may be configured to store a full copy of events blockchain 214 for a supply chain. Events blockchain 214 is an example of one implementation of events blockchain 146 for supply chain 102 including production system 106 in FIG. 1. A unique events blockchain may be created for each supply chain for which event information is to be tracked.

Only trusted entity 216 may have permission to access events blockchain network 202 to read from or submit event information 218 to events blockchain 214 for a particular supply chain. For example, without limitation, trusted entity 216 may be the owner or operator of a supplier or other component of a supply chain or another trusted entity. For example, without limitation, trusted entity 216 may be an aircraft manufacturer that has permission to read from and submit event information 218 to events blockchain 214 for a production system or other portion of a supply chain for producing an aircraft. Other trusted entities may receive permission to access events blockchain network 202 for a particular production system from the owner or operator of a supplier or other component of the supply chain.

Blocks 220, 222, 224, and 226 in events blockchain 214 may be created and encrypted using a hash value, with each new block added to events blockchain 214 referencing the previous blocks in events blockchain 214. As blocks are added to events blockchain 214 the robust nature of the encryption increases as the encryption of each subsequent block is based on the previous blocks. As a result, it becomes exponentially more difficult to fraudulently change any of blocks 220, 222, 224, or 226 in events blockchain 214 without being detected.

Trusted entity 216 with the proper permissions may access events blockchain network 202 to provide updates to events blockchain 214 for a particular supply chain. Trusted entity 216 may submit transaction 228, including event information 218 about a new event in the supply chain, to events blockchain network 202. Any new transaction 228 submitted to events blockchain network 202 is propagated across network 202 to all nodes 204, 206, 208, 210, and 212 in events blockchain network 202. At each node 204, 206, 208, 210, and 212 a new block may be added to events blockchain 214 to include the new event information 218 provided by transaction 228.

Trusted entity 216 with the proper permissions may access events blockchain network 202 for a particular supply chain to read information 230 comprising stored event information 218 for the supply chain from events blockchain 214 for the supply chain. Data veracity for events blockchain 214 at a particular node in plurality of nodes 204, 206, 208, 210, and 212 in events blockchain network 202 may be verified by checking the equivalent events blockchain at other nodes and comparing a hash value for the last block. For example, to confirm the veracity of data from events blockchain 214 obtained from node 204, trusted entity 216 may compare the hash value for the last block in events blockchain 214 to the hash value of the last block in the corresponding events blockchain in other nodes 206, 208, 210, or 212 of events blockchain network 202.

Each block 220, 222, 224, 226 in events blockchain 214 stores event information 218 for one event. In this example, event information 218 stored in events blockchain 214 indicates the locations of parts in a production system or elsewhere in a supply chain at particular times. For example, without limitation, event information 218 stored in each block 220, 222, 224, 226 of events blockchain 214 may include time 232 at which the event occurred, part identifier 234 for identifying a particular part in the production system or elsewhere in the supply chain in any appropriate manner, and location information 236 indicating the location of the part in the production system or in the supply chain at the identified time. The information stored in events blockchain 214 thus may be used to determine the state of a production system to include a supply chain at any point in time.

In this example, the event information 218 in block 220 indicates that at time A 238, part A 240, is in location A 242. The event information 218 in block 222 indicates that at time A 238, part B 244, is in location B 246. The event information 218 in block 224 indicates that at time B 248, part C 250, is in location C 254. The event information 218 in block 226 indicates that at time C 256, part A 240, has moved to location D 258.

Figure 3:
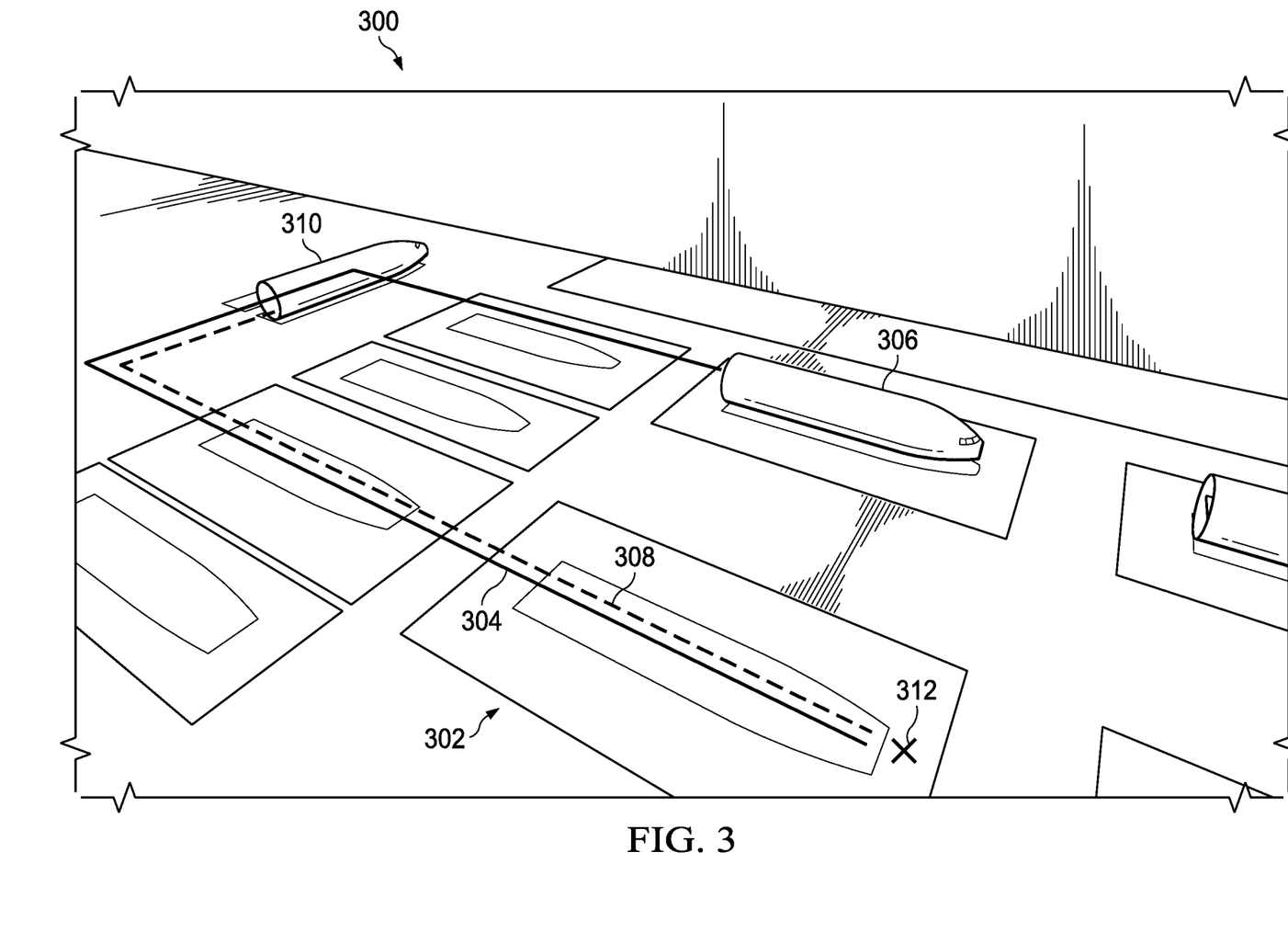
FIG. 3 is an illustration of a visualization of an undesirable condition in a production system in accordance with an illustrative embodiment.

Turning to FIG. 3, an illustration of a visualization of an undesirable condition in a production system is depicted in accordance with an illustrative embodiment. Visualization 300 is an example of one possible visualization 166 of locations 125 of parts 110 in production system 106 as generated by process model simulator 130 in system 100 in FIG. 1.

Visualization 300 includes a graphical representation of a portion of production system 302. In this example, portion of production system 302 is a portion of an aircraft manufacturing facility.

Visualization 300 illustrates the movement of a part of an aircraft through production system 302 over a selected period of time. The expected or desired movement of the part through production system 302 over the selected period of time is indicated by solid line 304, with the expected or desired location of the part in production system 302 at a selected point in time indicated at 306. The expected or desired movement of the part may be determined by process model simulation of the aircraft manufacturing production process in production system 302. Actual movement of the part through production system 302 over the selected period of time is indicated by broken line 308, with the actual location of the part in production system 302 at the selected point in time indicated at 310. The actual movement of the part may be determined from sensor data provided by appropriate sensors in production system 302. Solid line 304 and broken line 308 are separated from each other in FIG. 3 for clarity.

Visualization 300 indicates that the actual location of the aircraft part matched the expected location of the aircraft part at point X 312 in production system 302. After point X 312, delays in the production process performed in production system 302 resulted in the actual movement of the part through productions system 302 falling behind the expected or desired movement of the part through production system 302. This undesirable condition in production system 302 is represented graphically in visualization 300 by the difference between the indicated expected location 306 and the indicated actual location 310 of the part in production system 302 at the selected point in time after point X 312.

Figure 4:
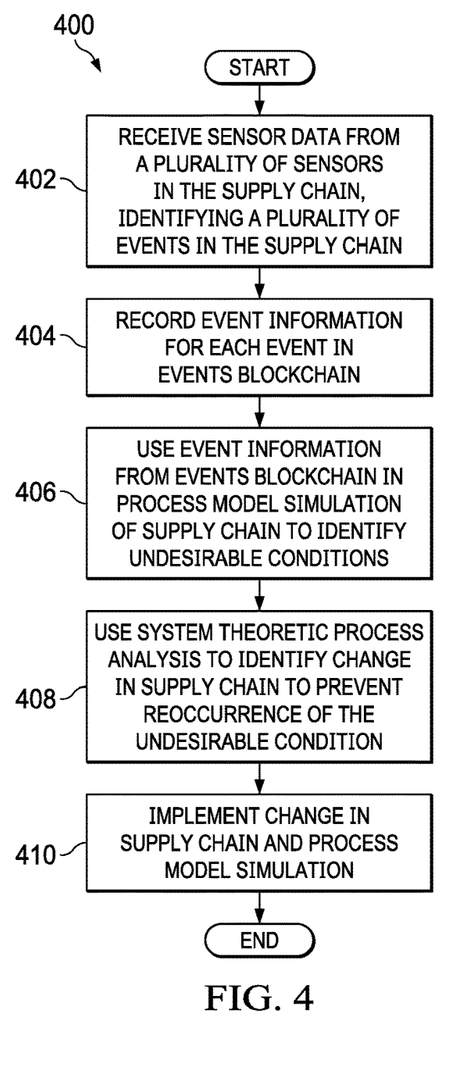
FIG. 4 is an illustration of a flowchart of a process for controlling a production system and supply chain based on integration of blockchain, simulations, and system theoretic process analysis (STPA) in accordance with an illustrative embodiment.

Turning to FIG. 4, an illustration of a flowchart of a process for controlling a supply chain based on integration of blockchain, simulations, and system theoretic process analysis (STPA) is depicted in accordance with an illustrative embodiment. Process 400 may be implemented, for example, in system 100 in FIG. 1.

Process 400 begins with receiving sensor data from a plurality of sensors in a supply chain (operation 402). The sensor data identify a plurality of events occurring in the supply chain or production system. Event information for each of the events is recorded in an events blockchain (operation 404). The event information is retrieved from the events blockchain and used in a process model simulation of the supply chain to identify undesirable conditions (operation 406). System theoretic process analysis then is used to determine a change in the supply chain that may be made to prevent occurrence or reoccurrence of the undesirable condition (operation 408). For example, without limitation, the change may comprise new controls. The new controls or other change is implemented in the supply chain and in the process model simulation of the supply chain (operation 410), with the process terminating thereafter.

Figure 5:
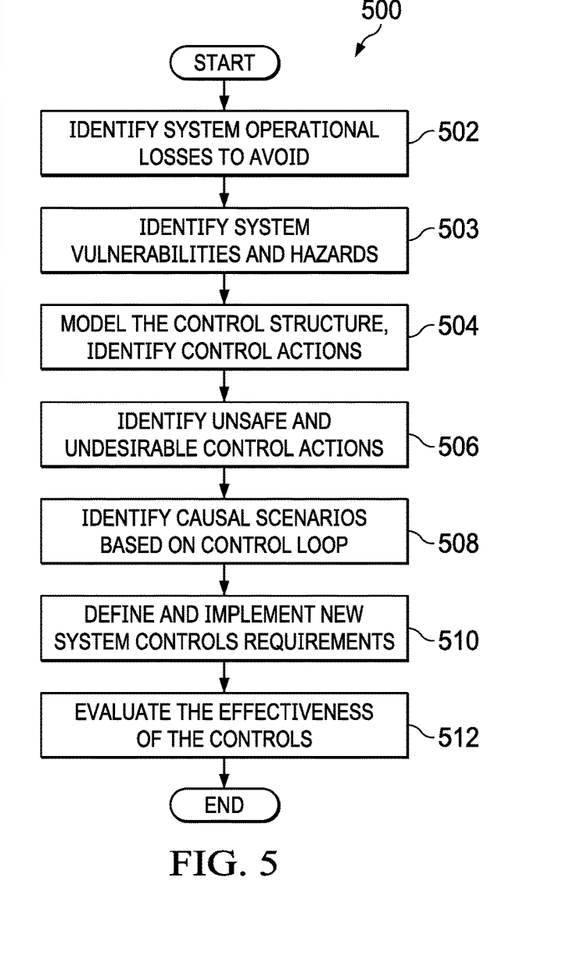
FIG. 5 is an illustration of a flowchart of a process for using system theoretic process analysis to prevent undesirable conditions in a supply chain in accordance with an illustrative embodiment.

Turning to FIG. 5, an illustration of a flowchart of a process for using system theoretic process analysis to prevent undesirable conditions in a supply chain is depicted in accordance with an illustrative embodiment. Process 500 is an example of one implementation of operations 408 and 410 in process 400 in FIG. 4. Process 500 may be implemented, for example, in system theoretic process analysis system 132 in system 100 in FIG. 1.

Process 500 begins with identifying system operational losses to avoid (operation 502). For example, the identified system operational losses may correspond to undesirable conditions in a supply chain or production system that are to be prevented. In this example, the purpose of the analysis is to prevent the occurrence of the undesirable conditions in the production system or supply chain. Therefore, operation 502 defines the purpose of the analysis. The undesirable conditions identified in operation 502 may include any condition that involves a loss of something of value. For example, without limitation, such undesirable conditions may include a loss of efficiency, a loss of quality, a loss of timeliness, risk of injury, property damage, environmental pollution, loss of mission, loss of reputation, or any other loss that is unacceptable to stakeholders. As described above, such undesirable conditions may be identified by process model simulation of the production system and supply chain.

System vulnerabilities and hazards are identified (operation 503) and the control structure of the supply chain is then modeled to identify control actions (operation 504). Operation 504 may include modeling feedback control loops for the supply chain. An effective control structure will enforce constraints on the behavior of the overall system. For example, without limitation, operation 504 may include modeling of feedback 140 to control system 118 and control actions 120 generated by control algorithm 122 in control system 118 in response to feedback 140 to control production system 106 and supply chain 102 in FIG. 1.

Unsafe or otherwise undesirable control actions are then identified (operation 506). An undesirable control action is a control action that, in a particular context and worst-case environment, will lead to an undesirable condition and a loss. There are four ways that a control action can be undesirable: not providing the control action leads to an undesirable condition; providing the control action leads to an undesirable condition; providing a potentially safe control action but too early, too late, or in the wrong order; and the control action lasts too long or is stopped too soon.

Causal scenarios based on the control loop are then identified (operation 508). A causal scenario describes the causal factors that can lead to unsafe or undesirable control actions and thus to undesirable conditions and loss. Two types of causal scenarios may be considered in operation 508: causal scenarios in which unsafe or undesirable control actions occur and causal scenarios in which control actions are improperly executed or not executed, leading to undesirable conditions and loss.

New system controls requirements are then defined and implemented (operation 510). The new system controls requirements are examples of changes to prevent the occurrence of loss scenarios. Operation 510 may include designing changes to the control system, feedback, or any other appropriate part or combination of parts of a production system or supply chain. After implementation, the effectiveness of the controls may be evaluated (operation 512), with the process terminating thereafter.

Process 500 may be used to identify changes that may be implemented in an existing production system or supply chain. Alternatively, or in addition, process 500 may drive new design decisions or be used to evaluate existing design decisions and identify gaps and changes needed during productions system design and supply chain development.

Figure 6:
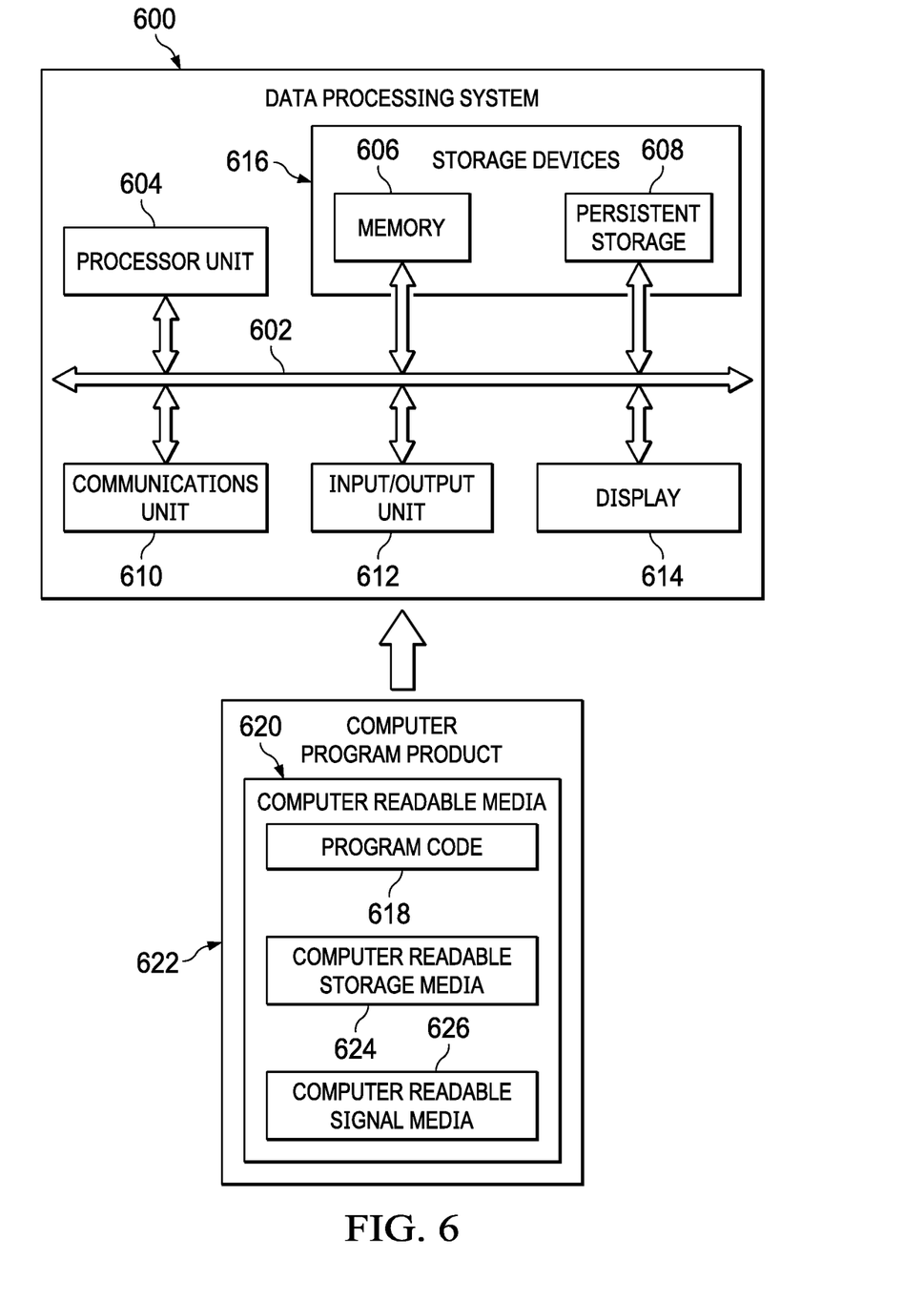
FIG. 6 is an illustration of a block diagram of a data processing system in accordance with an illustrative embodiment.

Turning to FIG. 6, an illustration of a block diagram of a data processing system is depicted in accordance with an illustrative embodiment. Data processing system 600 is an example of one possible implementation of a data processing system for performing the functions of controlling a supply chain based on the integration of blockchain and system theoretic process analysis (STPA), as described herein. For example, without limitation, data processing system 600 is an example of one possible implementation of a data processing system for implementing system 100 for controlling production system 106 to include supply chain 102 in FIG. 1.

In this illustrative example, data processing system 600 includes communications fabric 602. Communications fabric 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications fabric 602.

Processor unit 604 serves to run instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and other suitable information either on a temporary basis or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in communications fabric 602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling a production system that combines component parts, forming a product the method comprising:

receiving, in a control algorithm in a control system, sensor data from a sensor in the production system, wherein the sensor data identifies an event for one of the component parts in the production system, and wherein the control system is in a data processing system that controls the production system;

recording event information for the event in an events blockchain with a first block, comprising a first encryption, and a subsequent block, comprising a second encryption based upon the first encryption;

analyzing, using the data processing system, the event information for determining a desirability of a condition, caused by the event:

responsive to the condition being an undesirable condition, determining, using a process model simulator in the data processing system in near real time while the production system is operating:

an inadequate control in the production system that caused the undesirable condition; and a change to the control algorithm, directing a control action that eliminates the inadequate control and the undesirable condition; and applying the change to the control algorithm and thereby eliminating the inadequate control and the undesirable condition
wherein the supply chain product formed by the production system is a supply chain for an aircraft.

2. The method of claim 1, further comprising:
communicating, over a network to the data processing system, sensor data from a plurality of sensors in the production system, wherein each of the plurality of sensors comprises a unique identifier.

3. The method of claim 1 further comprising:
using the event information for the event from the events blockchain in a process model simulation of the production system to identify the undesirable condition in the production system.

4. The method of claim 3, further comprising:
receiving the sensor data from the sensor in the production system, wherein the sensor data identifies the event in the production system;
using the event information for the event from the events blockchain in the process model simulation of the production system and identifying the undesirable condition in the production system; and
using system theoretic process analysis to identify and identifying the change in the production system to prevent an occurrence of the undesirable condition.

5. The method of claim 3, wherein:
the event comprises a location of a part in the production system; and
the undesirable condition comprises a difference between the location of the part in the production system and an expected location of the part in the production system.

6. The method of claim 3 further comprising implementing the change in the production system to prevent an occurrence of the undesirable condition.

7. A system configured to combine component parts into a product, wherein the system comprises, comprising:
a control algorithm in a control system configured to control production of the product;
an events blockchain system, configured to receive sensor data from a sensor configured to provide feedback to the control system, wherein the sensor data is configured to identify an event for one of the component parts and to record event information for the event in an events blockchain; and a process model simulator configured to:
use the event information for the event from the events blockchain in a process model simulation of a production system to identify an undesirable condition in the production system and determine:
an inadequate control in the production system that caused the undesirable condition;
and a change to the control algorithm that directs a control action, needed to eliminate the inadequate control and the undesirable condition
wherein the supply chain product formed by the production system is a supply chain for an aircraft.

8. The system of claim 7, wherein: plurality of sensors comprises an Internet of things; and each of the plurality of sensors comprises a unique identifier and is configured to transfer the sensor data over a network to the events blockchain system.

9. The system of claim 7, wherein: the event comprises a location of a part in the production system; and the undesirable condition comprises a difference between the location of the part in the production system and an expected location of the part in the production system.

10. The system of claim 7, wherein the process model simulator is configured to use the event information for the event from the events blockchain in the process model simulation of the production system to identify the undesirable condition in the production system in near real-time as the event information for the event is recorded in the events blockchain.

11. The system of claim 7 further comprising a system theoretic process analysis system, configured to use system theoretic process analysis to identify the change of that eliminates the undesirable condition.

12. The system of claim 11 comprises a change to an undesirable control action, identified as being at least one of: too early, too late, lasting too long, or lasting too short, to prevent occurrence of the undesirable condition.

13. The system of claim 7, wherein the undesirable condition in the production system comprises: a loss of efficiency, a loss of quality, a loss of timeliness, a risk of injury, a property damage, an environmental pollution, a loss of mission, or a loss of reputation.

14. A computer program product, configured to control a production system that is configured to combine component parts and form a product the computer program product comprising a computer readable storage medium that comprises program instructions embodied therewith, the program instructions configured for execution by a data processing system to cause the data processing system to:
receive sensor data from a sensor in the production system, wherein the sensor data identifies an event for one of the component parts in the production system;
record event information for the event in an events blockchain;
responsive to the event representing an undesirable condition, determine in a process model simulator in the data processing system:
an inadequate control in the production system that caused the undesirable condition; and a change to a control action needed to eliminate the inadequate control and the undesirable condition; and
apply the change, to a control algorithm in a control system that controls the production system, and thereby eliminate the inadequate control and the undesirable condition
wherein the supply chain product formed by the production system is a supply chain for an aircraft.

15. The computer program product of claim 14, wherein:
a plurality of sensors comprises an Internet of things; and
each of the plurality of sensors comprises a unique identifier and is configured to transfer the sensor data over a network to the data processing system.

16. The computer program product of claim 14, wherein the program instructions are executable by the data processing system to cause the data processing system to:
use the event information for the event from the events blockchain in a process model simulation of the production system to identify the undesirable condition in the production system; and
use system theoretic process analysis to identify the change in the production system to prevent occurrence of the undesirable condition.

17. The computer program product of claim 16, wherein the change in the production system-comprises a change to an undesirable control action, identified as being at least one of: too early, too late, lasting too long, or lasting too short, to prevent occurrence of the undesirable condition.

18. The computer program product of claim 16, wherein:
the event comprises a location of a part in the production system; and
the undesirable condition comprises a difference between the location of the part in the production system and an expected location of the part in the production system.

\* \* \* \* \*

UNITED STATES PATENT AND TRADEMARK OFFICE
CERTIFICATE OF CORRECTION

| | | |
|---|---|---|
| PATENT NO. | : 11,593,731 B2 | |
| APPLICATION NO. | : 16/886085 | |
| DATED | : February 28, 2023 | |
| INVENTOR(S) | : Jeffrey H. Hunt and Lori S. Smith | |

It is certified that error appears in the above-identified patent and that said Letters Patent is hereby corrected as shown below:

In the Claims

Column 16, Line 10, Claim 11, correct "theoretic process analysis to identify the change of that" to read -- theoretic process analysis to identify the change that --

Signed and Sealed this
Sixth Day of June, 2023

Katherine Kelly Vidal
*Director of the United States Patent and Trademark Office*